United States Patent [19]
Goldfarb et al.

[11] Patent Number: 5,447,547
[45] Date of Patent: Sep. 5, 1995

[54] ANNULAR BATCH FEED FURNACE AND PROCESS

[75] Inventors: Victor Goldfarb, Swampscott; Andrew W. McClaine, Lexington; Jaime A. Woodroffe, North Reading; Ashok Chatwani, Burlington; David Stickler, Carisle; Joseph Stancato, Wilmington, all of Mass.

[73] Assignee: Gas Research, Inc., Chicago, Ill.

[21] Appl. No.: 189,196

[22] Filed: Jan. 31, 1994

[51] Int. Cl.⁶ .................... C03B 5/16; C03B 3/00; C03B 5/00
[52] U.S. Cl. .................... 65/134.1; 65/134.4; 65/135.2; 65/135.9; 65/335; 65/347
[58] Field of Search .................... 65/27, 134, 135, 335, 65/347, 134.1, 134.4, 135.2, 135.9, 136.1

[56] References Cited
U.S. PATENT DOCUMENTS

| | | | |
|---|---|---|---|
| 2,455,907 | 12/1948 | Slayter | 65/335 |
| 4,631,080 | 12/1986 | Westra et al. | 65/134 |
| 5,236,484 | 8/1993 | McNeill | 65/27 |

Primary Examiner—W. Gary Jones
Assistant Examiner—Steven P. Griffin
Attorney, Agent, or Firm—McAndrews, Held & Malloy, Ltd.

[57] ABSTRACT

A particle suspension furnace having an upper injector section, an intermediate combustion section and a lower separation section. The injector section comprises a central fuel conduit for supplying a rich fuel/air mixture to a burner at the base of the injector section, and a concentric annular mixing chamber for supplying a mixture of reactive or meltable batch particles and oxygen to the burner. The fuel-rich burner flame diffuses radially-outwardly to consume the peripherally-supplied oxygen and form an oxygen/fuel combustion mixture having a predetermined selected stoichiometry which is variable above and below 1:1 stoichiometry depending upon whether a reducing or oxidizing atmosphere is desired. The suspended particles absorb heat to quench the burner temperature and reduce the $NO_x$ pollutant formation.

13 Claims, 1 Drawing Sheet

ANNULAR BATCH FEED FURNACE AND PROCESS

BACKGROUND OF THE INVENTION

1. Field of the Invention

The present invention relates to an improved furnace and process for the feeding, mixing, suspension, calcining, reacting and/or melting of particulate batch materials in a combustion gas flow within a combustor, and for the continuous discharge of the combustion gases and the heat-treated or molten composition into a separation compartment to produce gas separation and high quality, homogeneous reacted and/or molten compositions. The invention is mainly concerned with the production of glass compositions but is applicable to any process in which particulate batch materials are being heated and/or melted while suspended in a combustion gas, and gaseous materials are being separated therefrom, such as calcining processes in which water vapor and carbon dioxide are released, melting ground glass cullet, vitrifying minerals, melting fiberglass scrap, etc.

2. Discussion of Prior Art

A wide variety of furnaces are known, such as for the production of molten glass from glass forming batch materials, which glass is fed into a molten pool while heat is applied to maintain a satisfactory temperature, such as about 1400° C.

It is known to preheat and/or melt batch materials before their introduction to a molten pool, and reference is made to U.S. Pat. Nos. 3,443,921; 3,741,742; 4,135,904 and 4,816,056 for their disclosures of glass-making furnaces incorporating premelting or preheating means.

It is also known to heat the molten glass in a glass-making furnace by means of combustion gas jets directed from above the molten glass pool and/or to impart circulation to the molten pool and greater uniformity or homogeneity to the final glass. Reference is made to U.S. Pat. Nos. 3,489,547; 3,563,722 and 3,592,623 as well as U.S. Pat. No. 4,816,056 referred to above.

It is also known to introduce glass-forming batch materials to the glass-making furnace by feeding them into combustion gas burners for tangential discharge from the burner nozzles into an upper cyclone chamber of the furnace in which they are swirled and rendered molten before passing as a melt into the molten glass pool at the base of the furnace. Reference is again made to U.S. Pat. No. 3,563,722.

Such prior known glass-making furnaces are not as efficient as possible with respect to heat transfer, particle/gas separation and molten pool circulation and uniformity. Improvements in pool circulation result in more complete fining or gas bubble separation and greater uniformity of the molten composition and homogeneity of the formed glass.

Commonly-owned U.S. Pat. Nos. 4,617,042; 4,617,046 and 4,631,080 disclose methods of and apparatus for heat processing particulate material wherein finely pulverized glass batch material is heated very rapidly by preheating and mixing glass batch material in suspension in preheated oxidizer and/or fuel flow in an injector assembly, heating the glass batch material to a high temperature in the burner assembly, directing the products of combustion and high temperature batch material suspended therein through an accelerating nozzle, to form a downwardly directed linear flow having a small cross-sectional area, and causing the accelerated flow exiting from the nozzle to impact on a solid impact surface above the molten pool, the high temperature batch material adhering to this impact surface and then flowing down its sides to the molten pool.

In accordance with the aforementioned Patents, glass batch material is heated in suspension in the products of combustion to a condition at which it can form a flowing layer on the solid interposed impact surface and rapidly react to form glass product. The impact body provides the multiple function of separation of the glass batch material from the products of combustion, fining and at least substantial reaction of the constituents of the glass batch material.

In addition to efficient heat transfer, highly effective glass fining is provided by a thin flowing melt layer having strong internal shear motion. Thus, prior art fining agents, such as sulfates, are not required, which eliminates a source of $SO_x$ pollutant emission. The inventions of the Patents also allow accurate control of combustion stoichiometry, so that carbon addition to the batch, as would normally be required for reduced flint glass production, is not necessary.

Among the problems encountered with such furnaces is the difficulty in obtaining a uniform particle distribution and suspension throughout the combustion chamber, or in obtaining the necessary duration of suspension to produce uniform heating and/or melting of particles of various sizes, or in obtaining high batch loading or throughput while retaining the necessary temperature of the combustion gases and producing the desired temperature quenching to reduce the formation of $NO_x$ pollutant gases.

SUMMARY OF THE INVENTION

The novel melting furnaces of the present invention comprise a novel means for injecting and continuously premixing particulate meltable materials with combustion supporting gas, such as oxygen gas, in an annular feed chamber, and introducing the uniform mixture around and directly into the flames of a fuel-rich, fuel-/oxygen mixture supplied through an adjacent central, axial torch, at the entrance to a combustion chamber, whereby the combustion supporting gas in the batch mixture provides the necessary additional oxygen required for stoichiometric combustion at the outlet of the torch. This causes the combustion gases and the batch mixture to diffuse and expand turbulently into the larger combustion chamber to form a uniform particle suspension in the hot combustion gases in which the particles are heated rapidly by radiant and convective heat-transfer and quench the temperature of the flames. The use of oxygen is preferred over the use of air as the combustion supporting gas in the batch mixture since it reduces the $NO_x$ levels significantly by avoiding the introduction of nitrogen present in air. Also, the torch flame temperature of the stoichiometric fuel/oxygen mixture is quenched by the heating of the batch particles present in the oxygen-particle mixture as the oxygen-poor fuel mixture diffuses therein to seek stoichiometry during combustion, thereby further reducing the $NO_x$ levels in the emission. The batch may be gravity fed, or pressurized air may be injected with the batch to increase the feed velocity.

THE DRAWINGS

FIG. 1 is a schematic elevational cross-section of an oxygen-fuel furnace for the melting of suspended particles of batch material, such as glass-forming batch materials, according to an embodiment of the present invention.

DETAILED DESCRIPTION

Figure 1:
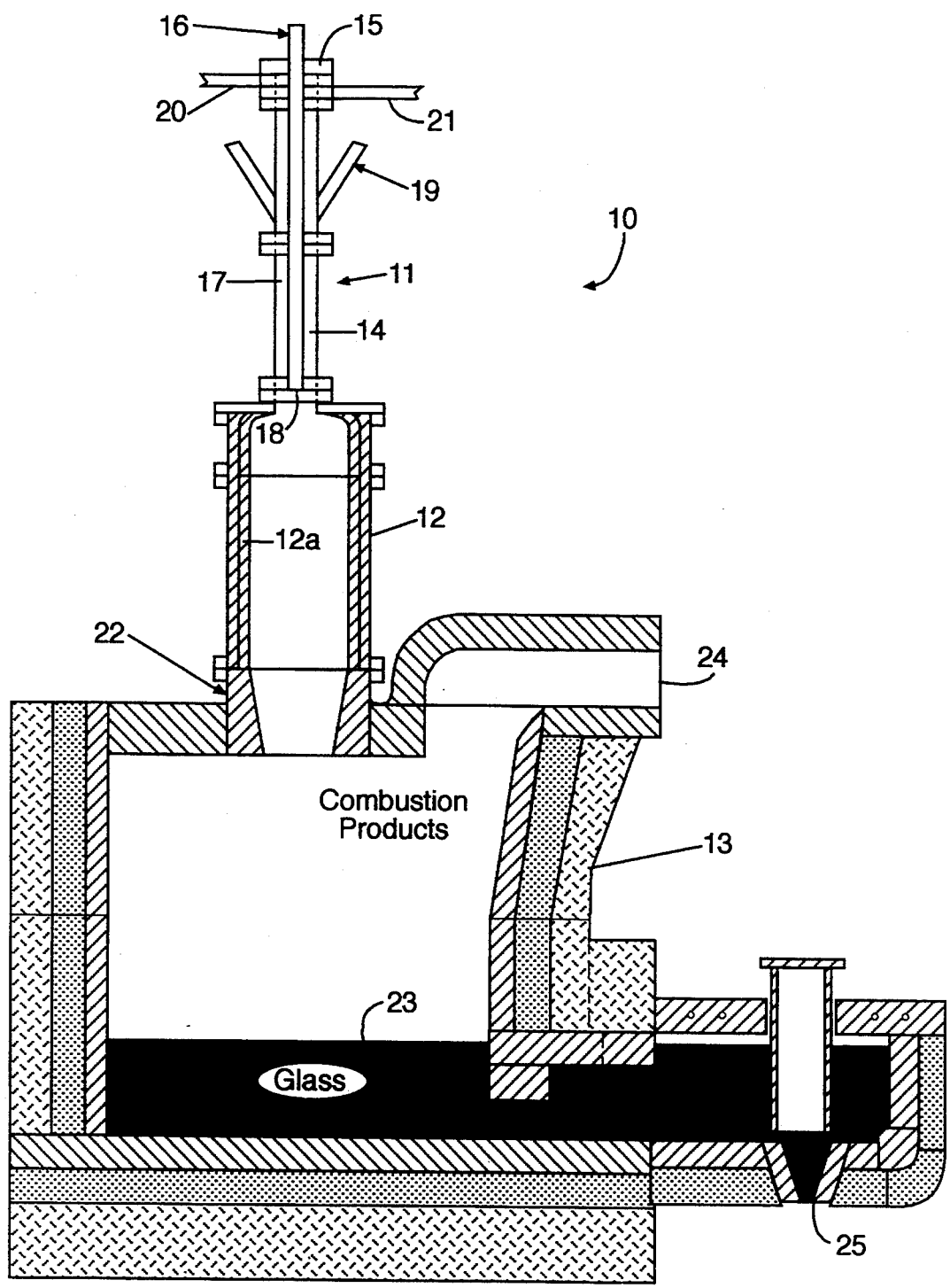

Referring to the drawing, the vertical shaft furnace 10 of FIG. 1 comprises an injector section 11, a combustor section 12 and a separation section 13.

The injector section 11 comprises a cylindrical housing 14 having a cap 15 provided with a central bore through which a torch pipe 16 passes and extends axially the entire length of the injector section 11 to open into the combustion zone at the entrance of the combustor section 12 for supplying a fuel-rich mixture of a gaseous fuel, such as natural gas or propane, and a combustion-supporting gas, such as oxygen, to the torch nozzle 18. The injector section 11 also includes an elongate annular passage or mixing chamber 17 within the housing 14 and surrounding the central torch pipe 16. Chamber 17 is sealed at the top by the cap 15 and is open at the bottom, adjacent the outlet or torch nozzle 18 of the torch pipe 16, into the combustion zone at the ceiling area of the combustor section 12. A plurality of radially-extending batch feed conduits 19 open downwardly at an angle of up to about 75°, preferably about 30°, into an intermediate area of the annular mixing chamber 17 to permit the drop-feeding or pneumatic injection of solid particulate batch materials into the chamber 17. Upstream of said conduits 19 are oxygen supply pipes 20 and optional pressurized air supply pipes 21 for feeding a continuous supply of oxygen and, if desired, temperature-moderating air into the annular chamber 17 to provide a gaseous oxygenated flow vehicle for the batch particles gravity-fed at predetermined rates into conduits 19 and to supply a uniform mixture of the necessary oxygen and dispersed particles of batch material uniformly around the torch nozzle 18 directly into the combustion flame. The fuel-rich flame at nozzle 18 diffuses radially-outwardly in all directions to consume the oxygen supplied through the annular passage 17 and become stoichiometric, and expands the combustion gases into the larger area of the combustion chamber 12. The batch particles suspended in the combustion gases rapidly absorb heat therefrom during reaction or melting and thereby quench the temperature of the burner flames and combustion gases and significantly reduce the formation of $NO_x$ compounds, which are pollutants.

The conduit or torch pipe 16 supplies a fuel-rich mixture comprising all the fuel, such as natural gas or propane and some of the oxygen required for the combustion process. The fuel-rich mixture can range from near-stoichiometric to a fuel rich stoichiometry greater than about four. At a fuel-rich stoichiometry of about four the flame temperature at the nozzle 18 of the torch is only about equal to the melting temperature of some of the volatile materials present in the batch mixture. Therefore volatization or evaporation of the volatiles in the nozzle region of the torch, which is poorly quenched by particles, is minimized. Fuel mixes with the mixture of particles and oxygen which flows from the annular chamber 17 into the area surrounding the nozzle 18, burns and heats the particles which quenches the flame temperature. This provides substantially-complete combustion of the fuel gases within the combustor to maximize the heating of the particles being melted, calcined or reacted.

The relative volumes of fuel gas and oxygen can be varied to produce a predetermined selected stoichiometry in the combustion zone, depending upon whether a neutral, a reducing or an oxidizing atmosphere is desired.

The exclusive use of oxygen is preferred since oxygen eliminates the nitrogen diluent present in air and increases the particle loading of the system. Particle loading is the ratio of the mass of the particles of batch material to the mass of combustion products produced. As the heat losses of the system are reduced the particle loading may be increased until it inhibits the mixing of the fuel and the oxygen. The present system performs well with a particle loading of 1.5 but higher loadings of 5 or greater are possible.

The duration of suspension of the batch particles in the hot combustion gases is extended by the diffusion and uniform dispersion of the particle suspension throughout the area of the combustion chamber 12, which assures that the batch particles are uniformly heated or calcined when the suspension is ejected through the lower nozzle 22 into the separation section 13 where the near-molten or calcined particles are separated from the hot combustion and/or reaction gases and deposit while the combustion and/or reaction gases are withdrawn through an overhead exhaust conduit 24, preferably to a heat-recovery system. In melting processes some of such as glass-making processes, the glass forming particles are melted and they and the near-molten particles deposit in molten pool 23 which can be withdrawn, as needed, through drain 25, for further appropriate processing, such as for the manufacture of glass items.

The separation of the molten and near-molten particles and the hot combustion gases may occur on impact of the particle suspension flow with the surface of the molten pool, whereby the particles are dissolved into the pool and the hot combustion gases are repelled. Alternatively, the separation section 13 may contain a solid impact member such as a central dome member, as illustrated in aforementioned U.S. Pat. No. 4,617,042, which is impacted by the particle flow to cause the particles to deposit and layer thereon and flow into the pool while the combustion gases are separated therefrom and evacuated.

The particulate raw materials which can be used in the present process and apparatus are conventional materials which will differ in composition depending upon the exact type of melt or reaction being produced, e.g., glass-forming composition, calcining composition, fiberglass composition, etc. The only critical requirement is that the raw materials must be in particulate form, preferably with uniform particle sizes which promote rapid and uniform heat-up, control the final temperature of the individual components, and minimize vaporization.

The feed rate for the particulate batch materials introduced by gravity feeding means through inlet conduits 19 may be varied widely depending upon particle size and the flow rate of the oxygen and/or compressed air into the combustor inlets 20 and 21, as will be apparent to those skilled in the art.

Meltable batch materials having smaller particle sizes require higher nozzle flow velocities in order to produce the necessary impact and separation force against the molten pool surface or against the solid impact member. Larger batch particles produce the desired results at lower nozzle flow velocities.

The force of the accelerated particle-laden gas flow from the combustor nozzle 22 and the distance between the nozzle and the surface of the molten pool 23 in the reservoir or pool section 13 must be such that the desired separation occurs.

For glass melting processes, the combustor 12 preferably is lined with a glass-compatible refractory liner 12a applied over a refractory insulation. The purpose of the insulation and liner is to maintain the wall temperature high enough to prevent devitrification of the melting glass materials but low enough to prevent significant flow of the molten glass over the wall. By maintaining the wall at moderate temperature, the molten glass can be used as a protective layer for the refractory liner to increase the lifetime of the liner.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Continuous process for the heating of particulate batch materials while they are suspended in hot combustion gas and for the separation of the heated particles from the combustion gas, comprising continuously supplying a gaseous fuel and less than a stoichiometric quantity of a combustion-supporting gas through a burner conduit as a fuel-rich mixture to the outlet of said conduit in a combustion zone at the entrance to a larger combustion chamber; continuously and individually supplying said particulate batch materials and an additional amount of said combustion-supporting gas into an annular mixing chamber surrounding said burner conduit and exiting at said combustion zone to form a mixture of said combustion-supporting gas and said particulate batch materials and inject said mixture into said zone, burning the fuel-rich mixture and said additional amount of combustion-supporting gas as a mixture having a predetermined stoichiometry to form and expand into the combustion chamber a hot combustion gas in which the said particulate batch materials are suspended to heat the particulate batch materials, discharging the heated particulate batch materials and combustion gas into a reservoir chamber and withdrawing the combustion gas from said reservoir chamber.

2. Process according to claim 1 which comprises gravity-feeding said particulate batch materials into said annular mixing chamber.

3. Process according to claim 1 which comprises pneumatically-feeding said particulate batch materials into said annular mixing chamber.

4. Process according to claim 1 which comprises feeding said particulate batch materials radially into said mixing chamber at a plurality of spaced inlets.

5. Process according to claim 1 which comprises feeding said particulate batch materials radially into said mixing chamber at a downwardly-inclined angle up to about 75°.

6. Process according to claim 1 in which said particulate batch materials comprise meltable glass-forming batch material, and the interior wall of said combustion chamber comprises a glass-compatible refractory material.

7. Process according to claim 1 which comprises inertially-separating said particulate batch materials and combustion gas by discharging them against an impact surface and collecting the melted particulate batch materials in a molten pool in the reservoir chamber while exhausting the combustion gas.

8. Process according to claim 7 in which the impact surface comprises the surface of the molten pool.

9. Apparatus for suspending and heating particulate batch materials in hot combustion gas and for the separation of the heated particulate batch materials from the combustion gas, comprising an upper injector section, an intermediate larger combustion section having a combustion zone at the entrance thereto, and a lower separation section, a burner conduit for continuously supplying gaseous fuel and less than a stoichiometric quantity of a combustion-supporting gas through said injector section to a burner outlet in said combustion zone at the entrance to said combustion section; an annular mixing chamber in said injector section, surrounding said burner conduit and having an annular exit to said combustion zone; batch inlet means for continuously supplying a particulate batch material into said annular mixing chamber, and separate gas inlet means for supplying a combustion-supporting gas into said annular mixing chamber to form a mixture of said particulate batch materials and said gas for passage through said annular exit thereof into said combustion zone, to inject a uniform mixture of combustion-supporting gas and said particulate batch materials into said zone; means for burning said fuel and combustion-supporting gas at said burner outlet in said combustion zone as a mixture having a predetermined stoichiometry to form and expand into said combustion section a hot combustion gas in which the particulate batch materials are suspended to heat said particulate batch materials, and means for discharging the heated particulate batch materials and combustion gas from the combustion section into said separation section.

10. Apparatus according to claim 9 in which said batch inlet means for supplying particulate batch materials comprises a plurality of spaced radially-extending inlet conduits opening into said annular mixing chamber.

11. Apparatus according to claim 10 in which said inlet conduits extend radially-downwardly at an angle of up to about 75°.

12. Apparatus according to claim 9 in which said combustion section comprises an interior wall lined with a glass-compatible refractory material.

13. Apparatus according to claim 9 in which said means for discharging said heated particulate batch materials and combustion gas into the separation section comprises nozzle means for accelerating said particulate batch materials and combustion gas into the separation section.

* * * * *